Figure 1:
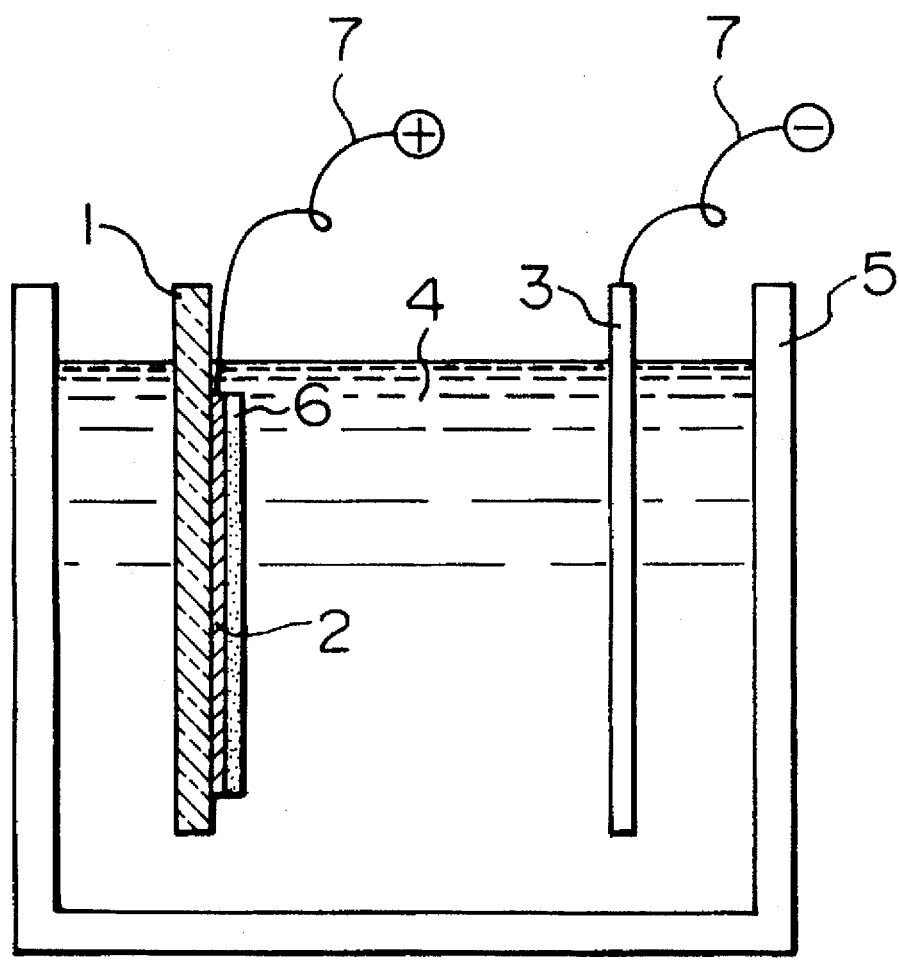

United States Patent
Watanabe et al.

[11] Patent Number: 5,674,369
[45] Date of Patent: Oct. 7, 1997

[54] METHOD FOR MANUFACTURING COLOR FILTER BY ELECTRODEPOSITION AND ELECTRODE USED THEREFOR

[75] Inventors: Tsutomu Watanabe, Itami; Toshiaki Ota, Narashino; Tsuyoshi Nakano, Tokyo, all of Japan

[73] Assignee: Sumitomo Chemical Company, Limited, Osaka, Japan

[21] Appl. No.: 535,830

[22] Filed: Sep. 28, 1995

[30] Foreign Application Priority Data

Oct. 31, 1994 [JP] Japan .................. 6-265904

[51] Int. Cl.$^6$ .................. C08F 2/58; C09D 5/44; C25D 3/04; G02F 1/335
[52] U.S. Cl. .................. 204/471; 204/489; 204/496; 205/284; 205/162; 359/68
[58] Field of Search .................. 204/471, 484, 204/489, 496, 180.2, 181.1, 181.4, 181.6; 205/284, 122, 162, 163, 164, 165, 166, 167

[56] References Cited

U.S. PATENT DOCUMENTS

| | | |
|---|---|---|
| 3,859,195 | 1/1975 | Williams .................. 204/272 |
| 4,142,950 | 3/1979 | Creamer et al. .................. 204/96 |
| 5,041,824 | 8/1991 | DiSanto et al. .................. 340/787 |
| 5,176,808 | 1/1993 | Byler et al. .................. 204/284 |
| 5,411,646 | 5/1995 | Gossett et al. .................. 204/284 |
| 5,443,707 | 8/1995 | Mori .................. 204/284 |

FOREIGN PATENT DOCUMENTS

| | | |
|---|---|---|
| 0444631 | 9/1991 | European Pat. Off. . |
| 523 245 | 1/1993 | European Pat. Off. . |
| 52-74575 | 6/1977 | Japan . |
| 60-023805 | 2/1985 | Japan . |

Primary Examiner—Kathryn L. Gorgos
Assistant Examiner—Eana Wong
Attorney, Agent, or Firm—Watson Cole Stevens Davis, PLLC

[57] ABSTRACT

A color filter having an improved uniformity of color layer thickness is industrially advantageously, manufactured by an electrodeposition method using as a counter electrode a wire netting-form electrode.

5 Claims, 1 Drawing Sheet

METHOD FOR MANUFACTURING COLOR FILTER BY ELECTRODEPOSITION AND ELECTRODE USED THEREFOR

The present invention relates to a method for manufacturing a color filter by electrodeposition and an electrode used therefor.

More specifically, the invention relates to a method for manufacturing a color filter having an improved uniformity of color layer thickness by electrodeposition, and an electrode used therefor.

In recent years, the body size or the display picture size of multi-color display devices such as liquid crystal display devices (LCD) has rapidly been enlarged with rapid improvement of the image quality.

Color filters useful for the multi-color display devices have been manufactured by a dyeing method, a pigment dispersion method, an electrode-position method, a printing method or others, according to which color layers including colored pixels and black matrices interlaced between the colored pixels are formed on the surface of a glass or other transparent substrate. Of these methods, particularly preferred is the electrodeposition method.

According to the electrodeposition method, it is known that the color layers are formed with high precision on an electroconductive layer formed in advance on the surface of a transparent substrate. It is also known that the method is simple in process, high in yield and low in manufacturing cost.

The method can be carried out, as known, by putting a transparent substrate having an electro conductive layer on the surface thereof as one electrode and another electrode as a counter electrode into an electrodeposition bath, applying a voltage thereto to form color layers on the electroconductive layer, drawing the electrodeposited substrate up from the bath and then heating the thus formed color layers.

As the substrate used as one electrode and the counter electrode, electroconductive layer-carrying transparent substrates such as a glass substrate having ITO (indium tin oxide) layer on the surface thereof, and electroconductive plates such as a stainless steel-made plate are used, respectively.

Both electrodes which are usually square in their shape and similar in their size, are put to face each other in parallel at a distance into an electrode position bath kept at a desired temperature. The electrodeposition bath is prepared by mixing colorants such as pigments, electrophoretic resins, and either water or an aqueous organic medium.

When a voltage ranging from 10 to 300 V is applied for 1 second to 3 minutes, a desired color layer is formed selectively on the electroconductive layer.

Color filters having multi-colored layers such as red-, green- and blue-colored layers can be obtained by repeating the electrodeposition by the number of times corresponding to that of colors.

With the greater market increase of multi-color display devices, it has been strongly required to develop improved methods for manufacturing high quality color filters with higher productivity, and also for fabricating color filters suitable for highly accurate and fine display devices of a larger picture size.

In order to meet the requirements, it is desired to develop an industrially advantageous method for manufacturing color filters of a superior uniformity of color layer thickness (the uniformity of color layer thickness being hereinafter referred to as layer uniformity for brevity) using a larger size substrate or increasing an available area of the substrate, the term "an available area of the substrate" being intended to mean the proportion of the area occupied by the color layers to the surface area of the substrate.

According to the present inventors' studies, in the above-mentioned existing electrodeposition method, by which color filters of a usual size have been obtained with an almost satisfactory layer uniformity, however, there can be observed a phenomenon such that gases inevitably generating during the electrodeposition run on the color layers formed on the electroconductive layer to produce unevenness of the color layers, so that fluctuation of the layer thickness is increased and as a result a layer uniformity all over the color layers is damaged. The larger the substrate size or the available area of the substrate, the greater the adverse effect of such phenomenon.

Thus, an object of the present invention is to solve the above-mentioned problems.

Another object of the present invention is to provide an industrially advantageous method capable of manufacturing color filters of a superior layer uniformity, even when the size of the transparent substrate to be used is further enlarged or the available area of the substrate is further increased.

In order to accomplish these and other objects the present invention provides a method for manufacturing a color filter by forming a color layer selectively on an electroconductive transparent thin layer formed on the surface of a transparent substrate by means of electrodeposition, which comprises conducting the electrodeposition using the electroconductive layer-carrying transparent substrate as one electrode, and a wire netting-form electrode as a counter electrode.

The invention also provides a wire netting-form electrode for use in the manufacture of a color filter by an electrodeposition method.

FIG. 1 is a schematic view exemplifying the electrodeposition system in accordance with the present invention for obtaining a color filter using as a counter electrode the present wire netting-form electrode.

In FIG. 1, the numeral 1 is a substrate having an electroconductive transparent thin layer on the surface thereof, 2 is the electroconductive transparent thin layer, 3 is a counter wire netting-form electrode, 4 is an electrodeposition bath, 5 is a vessel, 6 is a color layer, and 7 is a lead line.

It can be observed that gases generate inevitably due to the electrolysis of water during the electrodeposition, and run on the surface of color layers formed on the electroconductive layer. In consequence of the gas run, unevenness of the color layers is easy to appear to increase fluctuation of the layer thickness.

According to the method of the present invention, wherein the wire netting-form electrode is used as the counter electrode, the fluctuation of the layer thickness can be effectively suppressed to obtain a color filter having an improved layer uniformity, the reason of which is not always clear.

A mesh size of the wire netting-form electrode is not particularly limited. It can be determined depending on the size of the electroconductive layer-carrying substrate used as one electrode, in other words, the size of color filter to be obtained. Usually, however, it ranges preferably from 1 to 200 meshes, more preferably from 4 to 20 meshes.

The materials for making the wire netting-form electrode is not particularly limited, as far as they are electroconductive. Examples thereof are gold, silver, platinum, copper, stainless steel, and alloys containing copper, iron or the like. Of these, preferred are copper and stainless steel, because they are economical and durable.

The size and shape of the wire netting-form electrode are similar to those of the electroconductive layer-carrying substrate to be used as one electrode.

The electroconductive layer-carrying substrate used as one electrode can be prepared in a conventional manner. For example, it can be prepared by forming an electroconductive thin layer such as ITO layer (tin-doped indium oxide layer) or NESA layer (antimony-doped indium oxide layer) on the surface of a transparent substrate such as glass plate or plastic plate. If desired, the electroconductive layer can be subjected to etching or the like in order to form a plurality of electroconductive circuits insulated from each other in a desired pattern.

The electrical resistivity of the electroconductive layer is not particularly limited. In general, the lower, the better. In order to obtain a further improved layer uniformity, it is desirable to be 30 $\Omega/\square$ or less, preferably 20 $\Omega/\square$ or less, more preferably 15 $\Omega/\square$ or less.

The resistivity all over the electroconductive layer is made uniform as far as possible to obtain a better result. Also with respect to the evenness of the electroconductive layer-carrying substrate, it is desired to be as even as possible. If the resistivity and the evenness satisfy these requirements, the size of the electroconductive layer-carrying substrate is by no means limited in principle, so that a color filter of any large size can be obtained.

Moreover, the productivity of the color filter can be improved by enlarging the size of the electroconductive layer-carrying substrate to be used. These facts are the great advantages brought by the method of the present invention.

The available area of the electroconductive layer-carrying substrate, which may be intended here to mean the proportion of the area occupied by the electroconductive layer to the surface area of the substrate, is not particularly limited, but it is usually 60% or more.

The electrodeposition can be carried out in a conventional manner including anionic and cationic types. In the present invention, because of less influence against the electroconductive layer, preferred is the anionic type electrodeposition.

The electrodeposition bath can be prepared also in a conventional manner. For example, colorants of a desired color such as dyes and pigments, electrophoretic resins and if desired, conventional additives are dissolved or dispersed in water or an aqueous organic medium and then diluted with water or one or more organic solvents. Examples of the electrophoretic resins are maleinated oil, acryl resins, polyester resins, polybutadiene resins, and polyolefin resins, which may be thermo-setting or photo-curable.

A vessel used for the electrodeposition is not particularly limited as far as the materials thereof are insulators sufficiently resist against the electrodeposition bath. Examples are rigid plastic vessels such as rigid polyvinyl chloride- and acryl-made vessels.

The electroconductive layer-carrying substrate and the wire netting-form electrode are put to face each other in parallel at a distance into the electrodeposition bath kept at a desired temperature in the vessel.

Then, a direct voltage is applied using the electroconductive layer-carrying substrate and the wire netting-form electrode as anode and cathode, respectively, in case of the anionic electrodeposition being carried out, whereby desired color layers can be formed selectively on the electroconductive layer optionally patterned into circuits. The voltage applied ranges usually from about 10 to about 300 V, and the application time is usually from about 1 second to about 3 minutes. The layer thickness to be obtained can be controlled by changing the electrodeposition conditions.

After the electrodeposition is over, the electrodeposited substrate having the color layers of desired colors on the electroconductive layer is preferably rinsed with water or one or more organic solvents to remove any unnecessary substance. Additionally, the electrodeposited substrate is preferably subjected to heat-treatment in order to enhance a strength of the color layers.

When the color layers formed consists of colored pixels, and black matrices are desired to be formed between the colored pixels, the black matrices can be readily formed in a conventional manner, for example, by a method described in U.S. Pat. No. 4,812,387.

According to the method of the present invention using the wire netting-form electrode, color filters having an improved layer uniformity can be obtained industrially advantageously with a high yield. Particularly, the electrode and the electrodeposition method for manufacturing color filters in accordance with the present invention are useful for obtaining a color filter usable for highly accurate and fine multicolor display devices of a larger body size or a larger display picture size.

The present invention is illustrated in more detail with reference to the following Examples, which are only illustrative, but not limitative.

EXAMPLE 1

A green electrodeposition bath was prepared in a conventional manner using Phthalocyanine Green SAX (manufactured and sold by Sanyo Color Works in Japan) and Esbia ED 3000 Clear (an anionic polyester-containing paint for electrodeposition, manufactured and sold by Shinto Paint Co. in Japan).

There were prepared a glass substrate of 1.1 mm in thickness, 342 mm in length and 300 mm in width having, on the surface, ITO circuits of 15 $\Omega/\square$ in a stripe form of 80 µm in width at a distance of 20 µm (100 µm pitch), and as a counter electrode a stainless steel-made wire netting-form electrode of 10 meshes having the same size as that of the glass substrate.

The electrodeposition bath were put in a vessel, and thereafter the ITO circuits-carrying glass substrate and the counter wire netting-form electrode were put thereinto to face each other in parallel at a distance.

Then, electrodeposition was carried out using the ITO circuits on the substrate as anode under conditions of 30° C., 50 V and 10 seconds, whereby green color layers were formed selectively on the circuits. Thereafter, the substrate taken out was subjected to heat-treatment at 120° C. for 10 minutes.

There was observed no unevenness due to the gas run on the formed color layers by a visual judgement. Further, using a layer thickness meter (Dektak Type 16000, manufactured by Veeco Inst. Inc.), the layer thickness was measured at different 14 points, and the layer uniformity of the color layers obtained was judged by a layer uniformity percent calculated by the following equation.

A layer uniformity percent (%)={(maximum layer thickness−minimum layer thickness)/(average layer thickness of 14 points)}×100

The layer uniformity percent was found to be less than 15%, which value is recognized in this art for the layer uniformity to be "superior" from a practical point of view.

EXAMPLE 2

Example 1 was repeated, provided that a copper-made wire netting-form electrode was used in place of the stainless steel-made wire netting-form electrode.

On the color layers obtained, there was observed no unevenness due to the gas run.

COMPARATIVE EXAMPLE

Example 1 was repeated, provided that a stainless steel-made plate electrode was used in place of the stainless steel-made wire netting-form electrode. There was observed unevenness due to the gas run at considerable portions of the color layers obtained, and the layer uniformity percent was found to be much more than 15%.

What is claimed is:

1. A method for manufacturing a color filter by forming a color layer selectively on an electroconductive transparent thin layer formed on the surface of a transparent substrate by means of electrodeposition, which comprises conducting the electrodeposition using the electroconductive layer-carrying transparent substrate as one electrode, and a wire netting-form electrode as a counter electrode, wherein the electrodeposition is conducted by putting both electrodes to face each other at a distance in parallel into an electrodeposition bath which is open to the air, and applying a voltage thereto.

2. A method according to claim 1, wherein the electrode used as a counter electrode has a mesh size ranging from 1 to 200 meshes.

3. A method according to claim 1, wherein the electrode used as a counter electrode is made of a material selected from gold, silver, platinum, copper, stainless steel, and alloys containing copper or iron.

4. A method according to claim 1, wherein the electrodeposition bath contains a colorant, an electrophoretic resin and water or an aqueous organic medium.

5. A method according to claim 1, wherein the voltage ranges from about 10 to about 300 V.

* * * * *